United States Patent
Seok

(10) Patent No.: US 10,051,640 B2
(45) Date of Patent: Aug. 14, 2018

(54) METHOD AND DEVICE FOR PREVENTING INTERFERENCE IN OVERLAPPING SERVICE AREA

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 15/024,765

(22) PCT Filed: Jun. 19, 2014

(86) PCT No.: PCT/KR2014/005400
§ 371 (c)(1),
(2) Date: Mar. 24, 2016

(87) PCT Pub. No.: WO2015/060514
PCT Pub. Date: Apr. 30, 2015

(65) Prior Publication Data
US 2016/0249366 A1  Aug. 25, 2016

Related U.S. Application Data

(60) Provisional application No. 61/894,373, filed on Oct. 22, 2013.

(51) Int. Cl.
*H04W 84/12* (2009.01)
*H04W 72/08* (2009.01)
(Continued)

(52) U.S. Cl.
CPC .......... *H04W 72/082* (2013.01); *H04B 7/024* (2013.01); *H04B 7/0617* (2013.01);
(Continued)

(58) Field of Classification Search
None
See application file for complete search history.

(56) References Cited

U.S. PATENT DOCUMENTS

2006/0248429 A1* 11/2006 Grandhi ................ H04L 1/1664
714/749
2012/0026909 A1* 2/2012 Seok .................... H04B 7/0417
370/252
(Continued)

FOREIGN PATENT DOCUMENTS

JP    2013509795    3/2013
KR   1020110119520   2/2011
(Continued)

OTHER PUBLICATIONS

Korean Intellectual Property Office Application Serial No. 10-2016-7010589, Office Action dated Sep. 26, 2017, 7 pages.

*Primary Examiner* — Faruk Hamza
*Assistant Examiner* — Thinh Tran
(74) *Attorney, Agent, or Firm* — Lee, Hong, Degerman, Kang & Waimey

(57) ABSTRACT

A method and a device for preventing interference in an overlapping service area are disclosed. The method for preventing interference in an overlapping service area of a wireless LAN can comprise the steps of: receiving, by an interference AP, a beacon frame broadcasted by an AP, wherein the beacon frame includes an interference prevention information element; receiving, by the interference AP, a sounding PPDU indicated on the basis of the interference prevention information element from the AP; determining, by the interference AP, a transmission control matrix on the basis of the sounding PPDU; and transmitting, by the interference AP, data through a beam generated on the basis of the transmission control matrix.

8 Claims, 15 Drawing Sheets

(51) Int. Cl.
*H04B 7/024* (2017.01)
*H04B 7/06* (2006.01)
*H04W 16/28* (2009.01)
*H04W 72/04* (2009.01)
*H04L 1/00* (2006.01)
*H04W 88/08* (2009.01)

(52) U.S. Cl.
CPC ............... *H04L 1/00* (2013.01); *H04W 16/28* (2013.01); *H04W 72/046* (2013.01); *H04W 72/0426* (2013.01); *H04W 84/12* (2013.01); *H04W 88/08* (2013.01)

(56) References Cited

U.S. PATENT DOCUMENTS

| | | | |
|---|---|---|---|
| 2012/0230443 A1 | 9/2012 | Seok et al. | |
| 2012/0257574 A1* | 10/2012 | Seok ................... | H04W 72/082 370/328 |
| 2014/0098681 A1* | 4/2014 | Stager ................... | H04W 24/02 370/252 |
| 2015/0295629 A1* | 10/2015 | Xia ...................... | H04B 7/0491 370/329 |
| 2017/0346536 A1* | 11/2017 | Nabar ................... | H04B 7/0634 |

FOREIGN PATENT DOCUMENTS

| | | |
|---|---|---|
| WO | 2011025145 | 3/2011 |
| WO | 2011074761 | 6/2011 |
| WO | 2011115431 | 9/2011 |

* cited by examiner

FIG. 1
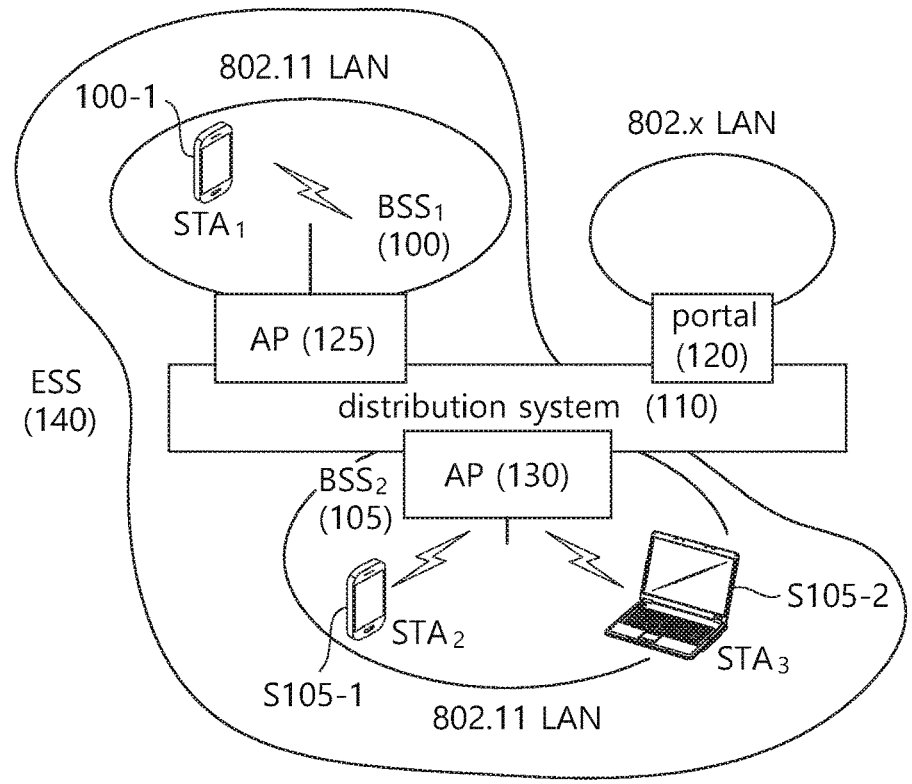
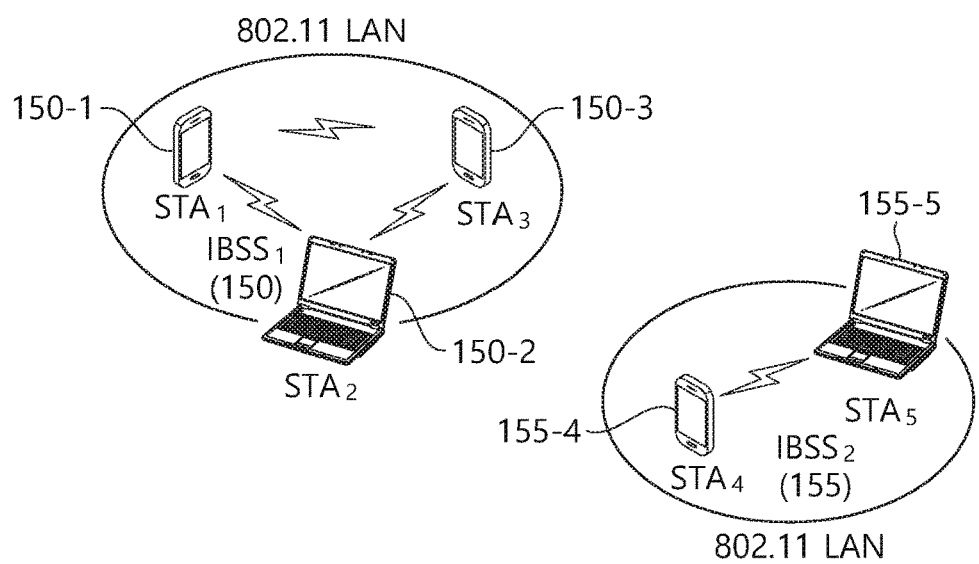

FIG. 3
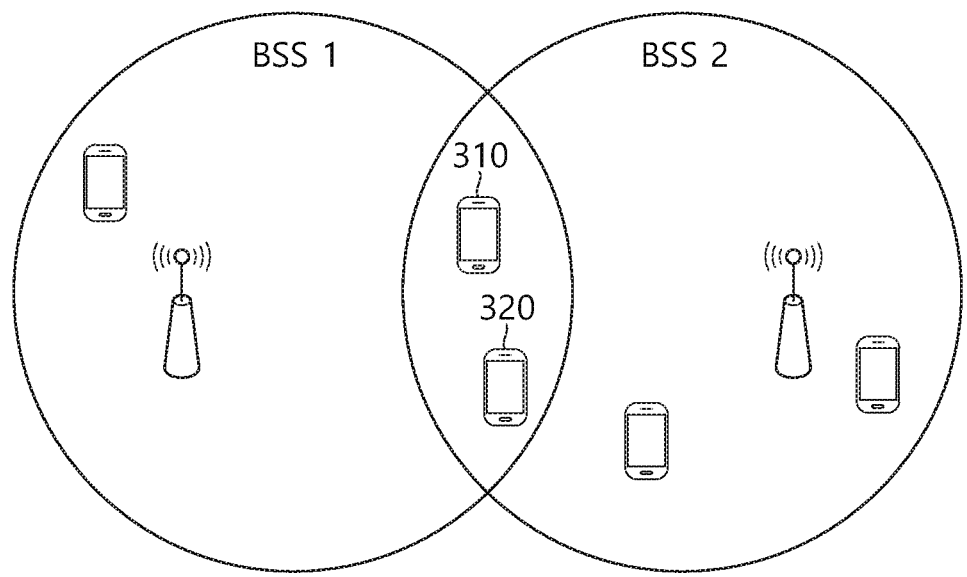
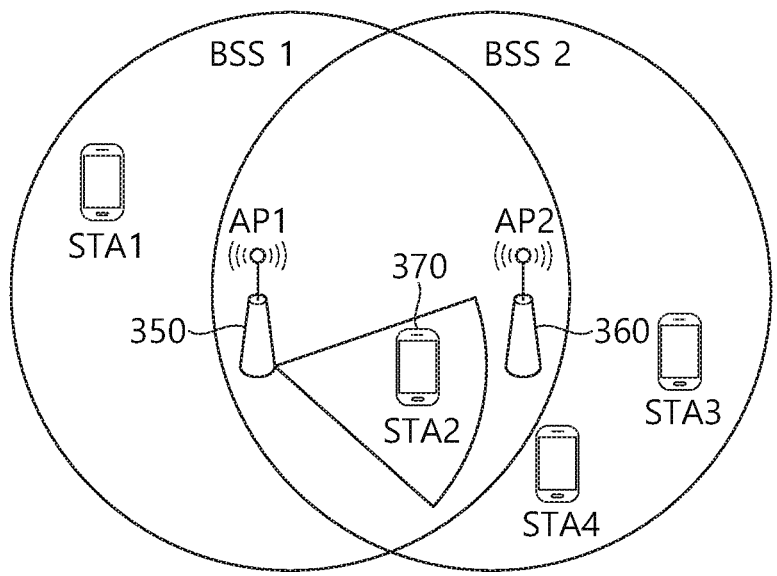

METHOD AND DEVICE FOR PREVENTING INTERFERENCE IN OVERLAPPING SERVICE AREA

CROSS-REFERENCE TO RELATED APPLICATIONS

This application is the National Stage filing under 35 U.S.C. 371 of International Application No. PCT/KR2014/005400, filed on Jun. 19, 2014, which claims the benefit of U.S. Provisional Application No. 61/894,373, filed on Oct. 22, 2013, the contents of which are all hereby incorporated by reference herein in their entirety.

BACKGROUND OF THE INVENTION

Field of the Invention

The present invention relates to wireless communications, and more particularly, to a method and an apparatus for preventing interference in a wireless communication system.

Related Art

In a wireless local area network (WLAN), there are two kinds of basic service sets (BSSs). A first type of BSS is an independent BSS (IBSS) that is a BSS in an ad-hoc mode, in which stations (STAs) can directly communicate with each other, not via an access point (AP). The IBSS does not allow access to a distribution system (DS). Thus, the IBSS may achieve a self-contained network. A second type of BSS may be an infrastructure BSS. The infrastructure BSS may include an AP and a plurality of STAs, in which the AP may be connected to a DS. Meanwhile, in an overlapping basic service set (OBSS) environment, a plurality of BSSs is present within a certain region and may overlap with each other in an area and overlapping service areas of the BSSs may cause interference between the BSSs.

When there are a large number of BSSs or a small number of frequency channels due to use of broadband of 80 MHz/160 MHz as in TGac, an OBSS may occur. In the OBSS environment, interference between STAs may cause drastic deterioration in performance. To mitigate interference in the OBSS environment, a selection algorithm for BSSs to actively select an available channel or a mechanism for communication between overlapping BSSs may be adopted. Alternatively, a mechanism in which communications between other overlapping BSSs are suspended during communication of a target BSS may be used. In addition, studies are being conducted on a variety of methods for preventing interference occurring between an AP and an STA in the OBSS environment.

SUMMARY OF THE INVENTION

An aspect of the present invention is to provide a method of preventing interference in an overlapping service area.

Another aspect of the present invention is to provide an apparatus for performing a method of preventing interference in an overlapping service area.

To achieve the aforementioned purposes of the present invention, a method of preventing interference in an overlapping service area of a wireless local area network (WLAN) according to one aspect of the present invention includes receiving, by an interfering access point (AP), a beacon frame broadcasted by an AP, the beacon frame including an interference avoidance information element; receiving, by the interfering AP, a sounding physical layer convergence procedure (PLCP) protocol data unit (PPDU) indicated based on the interference avoidance information element from the AP; determining, by the interfering AP, a transmit steering matrix based on the sounding PPDU; and transmitting, by the interfering AP, data through a beam generated based on the transmit steering matrix.

To achieve the aforementioned purposes of the present invention, an AP for preventing interference in an overlapping service area of a WLAN according to another aspect of the present invention includes a radio frequency (RF) unit configured to transmit or receive a radio signal and a processor selectively connected to the RF unit, wherein the processor receives a beacon frame broadcasted by another AP, the beacon frame including an interference avoidance information element, receives a sounding PPDU indicated based on the interference avoidance information element from the other AP, determines a transmit steering matrix based on the sounding PPDU, and transmits data through a beam generated based on the transmit steering matrix.

Interference which may occur in communication STAs may be prevented based on a sounding frame in an OBSS environment. Thus, interference between STAs may be reduced in an OBSS environment, such as a case where a large number of BSSs are present or a small number of frequency channels are available.

BRIEF DESCRIPTION OF THE DRAWINGS

FIG. 1 is a conceptual view illustrating the structure of a wireless local area network (WLAN).

FIG. 3 is a conceptual view illustrating an overlapping basic service set (OBSS) environment.

DESCRIPTION OF EXEMPLARY EMBODIMENTS

FIG. 1 is a conceptual view illustrating the structure of a wireless local area network (WLAN).

The upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105. The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP130 and one or more STAs 105-1 and 105-2 connectable to the AP130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a conceptual view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
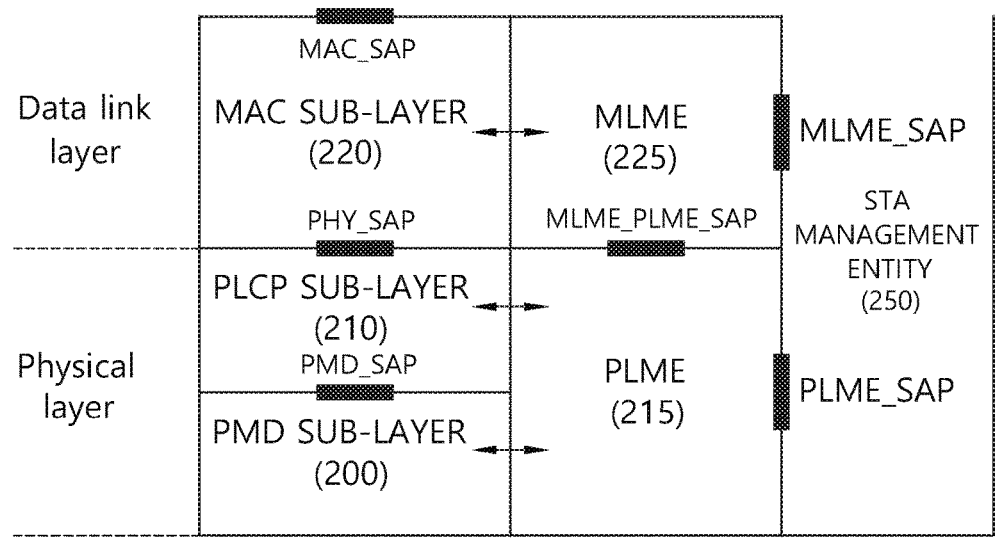
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225, and the management entity of the physical layer is denoted a PLME (PHY layer management entity, 215. Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250 to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

FIG. 3 is a conceptual view illustrating an overlapping basic service set (OBSS) environment.

Referring to FIG. 3, in the OBSS environment, a plurality of BSSs is present within a certain region and service areas (or service ranges) of the BSSs may overlap with each other. The overlapping service areas of the different BSSs may cause interference between the BSSs.

A service area may also be referred to as coverage. Generally, coverage of an STA may refer to an area (transmission (Tx)/reception (Rx) range) in which the STA transmits data to another STA or receives data from another STA. Alternatively, the coverage of the STA may refer to a carrier sensing (CS) range for performing CS on data transmitted from another STA. In the following embodiments of the present invention, it is assumed that a Tx/Rx range is the same as a CS range for convenience.

An upper part of FIG. 3 illustrates a case where a plurality of STAs 310 and 320 is present in an overlapping area of coverages of a plurality of BSSs. In an OBSS environment where the coverages of the plurality of BSSs overlap with each other, the STAs 310 and 320 communicating with a particular AP may encounter interference by data transmitted from another AP. Thus, performance deterioration in communications between the STAs 310 and 320 and the particular AP may occur by the interference. For similar reasons, interference may occur not only between the STAs and the other AP but also between the AP and the other AP in the OBSS environment. In the following embodiments of the present invention, an AP causing interference may be referred to as an interfering AP for convenience.

In the embodiments of the present invention, a direction of a beam transmitted by an interfering AP may be controlled based on a sounding PPDU transmitted between an AP and the interfering AP or between the interfering AP and an STA in order to solve an interference problem. The direction of the beam from the interfering AP determined based on the sounding PPDU may be determined towards a reduction in interference between the AP and the interfering AP or between the interfering AP and the STA.

A lower part of FIG. 3 illustrates an OBSS environment where APs respectively forming a plurality of BSSs are positioned in an overlapping area of the BSSs.

In the lower part of FIG. 3, STA2 370 is positioned in coverage of AP1 350 and coverage of AP2 360. When AP2 360 and STA2 370 are associated to perform communication, AP2 360 may form a beam for transmitting data to STA2 370. Since AP2 360 and STA2 370 are positioned within the coverage of AP1 350, communication between AP2 360 and STA2 370 may encounter interference by a beam formed by AP1 350.

The following embodiments of the present invention illustrate a method for reducing interference in an STA in an OBSS environment. Specifically, an interference mitigation procedure for mitigating interference in communication between AP2 and STA2 by AP1, which is an interfering AP, will be described.

Figure 4:
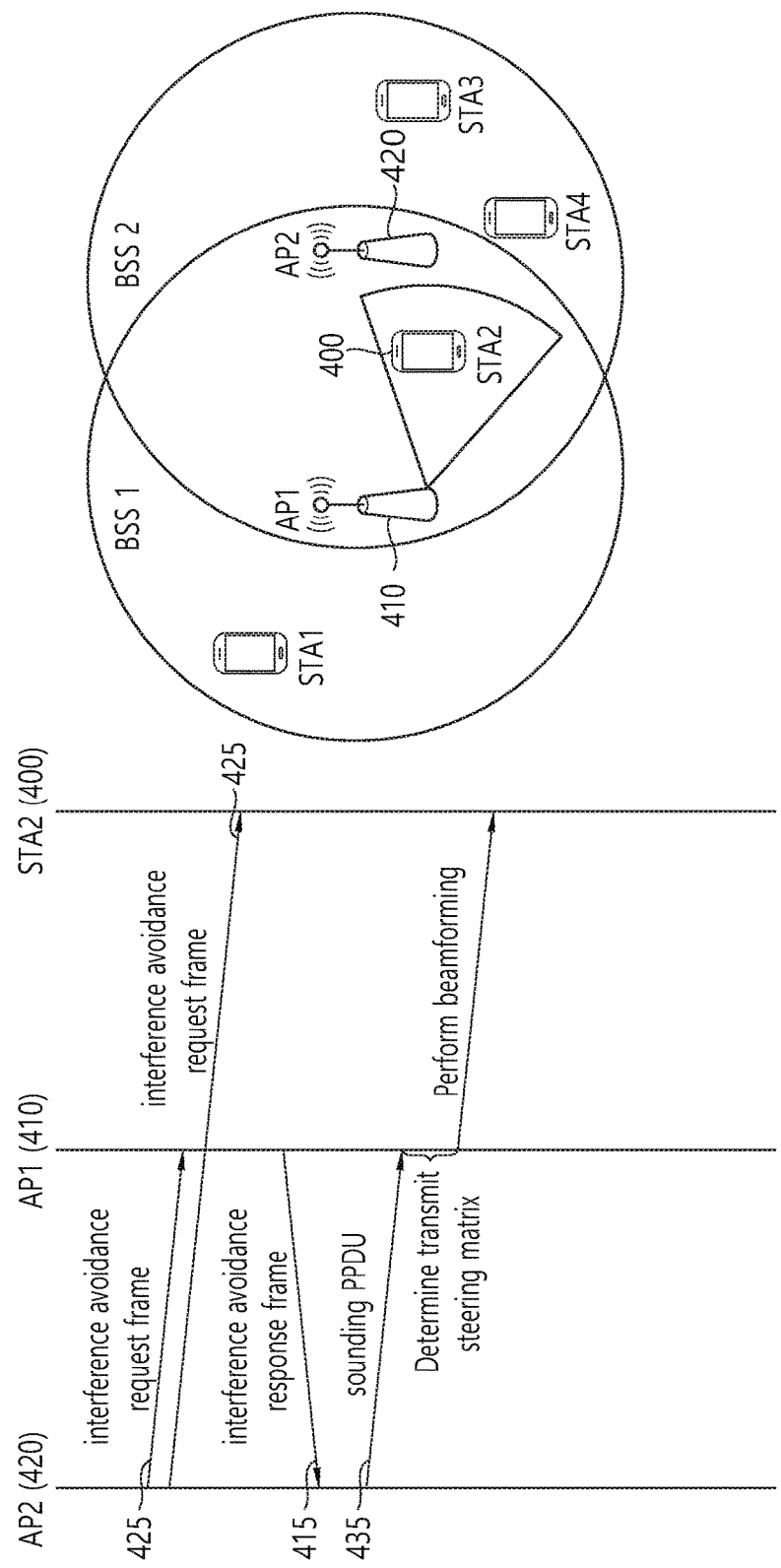
FIG. 4 is a conceptual view illustrating a method for reducing interference in an OBSS environment according to an embodiment of the present invention.

FIG. 4 is a conceptual view illustrating a method for reducing interference in an OBSS environment according to an embodiment of the present invention.

Referring to FIG. 4, coverage of a first BSS including AP1 410 may overlap with coverage of a second BSS including AP2 420.

In communication, AP2 420 may broadcast an interference avoidance request frame (I-avoidance request frame) 425 to avoid interference by a neighboring STA and/or a neighboring AP not communicating with AP2 420.

The interference avoidance request frame 425 may be broadcast to the neighboring STA and/or the neighboring AP to prevent in advance interference by the neighboring STA and the neighboring AP which may occur in communication of AP2 420. Alternatively, the interference avoidance request frame 425 may be broadcast to the neighboring STA and/or the neighboring AP to prevent continuous interference while AP 2 420 encounters interference.

The neighboring STA and/or the neighboring AP receiving the interference avoidance request frame 425 may transmit an interference avoidance response frame (I-avoidance response frame) 415. The neighboring STA and/or the neighboring AP transmitting the interference avoidance response frame 415 may be an AP and/or an STA not communicating (or not associated) with an AP and/or an STA transmitting the interference avoidance request frame (AP2 420 in FIG. 4). Further, the neighboring STA or the neighboring AP assumes that a direction of a transmitted beam is changeable.

In FIG. 4, AP1 410 may transmit an interference avoidance response frame 415 to AP2 420.

When AP2 420 receives the interference avoidance response frame from AP1 410, AP2 420 may transmit a sounding PPDU 435 to AP1 410. AP1 410 receiving the sounding PPDU 435 transmitted by AP2 420 may acquire channel information on a channel between AP1 410 and AP2 420.

AP1 410 may determine an appropriate transmit steering matrix for transmitting data to STA2 400 based on the sounding PPDU 435 received from AP2 420. When AP1 410 forms a beam for transmitting data based on the determined transmit steering matrix, interference in AP2 420 by AP1 410 may be minimized. As illustrated in FIG. 4, the beam formed by AP1 410 may be determined using the transmit steering matrix determined based on the sounding PPDU 435 transmitted by AP2 420. For example, the beam used for communication between AP1 410 and STA2 400 may be formed towards a reduction in interference in communication between AP2 420 and an STA (for example, STA2, STA3, and STA3) based on the transmit steering matrix. That is, interference in AP2 420 by the beam formed by AP1 410 may be reduced, which may improve performance of communication between STA2, STA3 or STA4 positioned within the coverage of AP2 420 and AP2 420.

Alternatively, downlink data transmission from AP1 410 to STA2 400 and uplink data transmission from STA3 and/or STA4 to AP2 420 may occur simultaneously. In this case, the beam formed by AP1 410 based on the transmit steering matrix may be formed towards a reduction in interference between AP1 410 and AP2 420. Thus, overall throughput in a WLAN system may be increased.

The sounding PPDU transmitted from AP2 420 to AP1 410 may be, for example, a null data packet (NDP) frame. The NDP frame may be a null data packet and may include only a PLCP header and a PLCP preamble excluding a data field.

Figure 5:
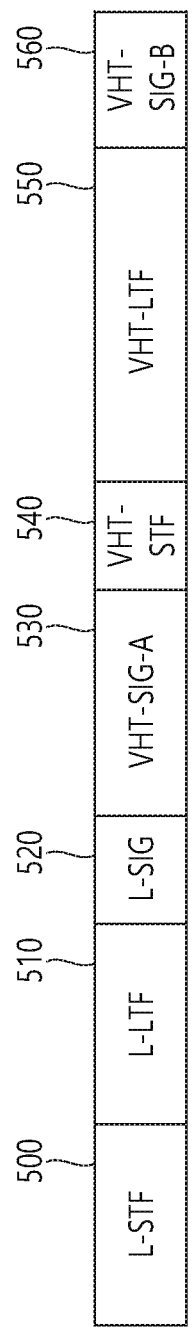
FIG. 5 is a conceptual view illustrating a sounding PPDU transmitted to reduce interference in an OBSS environment according to an embodiment of the present invention.

FIG. 5 is a conceptual view illustrating a sounding PPDU transmitted to reduce interference in an OBSS environment according to an embodiment of the present invention.

Referring to FIG. 5, a sounding PPDU may be an NDP frame including no data field.

The NDP frame may further include a legacy-short training field (L-STF) 500, a legacy-long training field (L-LTF)

510, a legacy signal (L-SIG) field 520, a very high throughput (VHT)-SIG-A 530, a VHT-STF 540, a VHT-LTF 550, and a VHT-SIG-B 560.

The L-STF 500, the L-LTF 510, and the L-SIG field 520 included in the NDP frame may be used for frequency offset adjustment, phase offset adjustment, and channel estimation for a legacy STA, respectively.

Specifically, the L-STF 500 may include a short training orthogonal frequency division multiplexing (OFDM) symbol. The L-STF 500 may be used for frame detection, automatic gain control (AGC), diversity detection, and coarse frequency/time synchronization.

The L-LTF 510 may include a long training OFDM symbol. The L-LTF 510 may be used for fine frequency/time synchronization and channel estimation.

The L-SIG 520 may be used to transmit control information. The L-SIG 520 may include information on data rate and data length.

A VHT PPDU may further include a VHT-SIG-A 530, a VHT-STF 540, a VHT-LTF 550, and a VHT-SIG-B 560. The VHT-SIG-A 530, the VHT-STF 540, the VHT-LTF 550, and the VHT-SIG-B 560 may be used for an STA supporting a VHT system.

The VHT-SIG-A 530 may include information for interpreting the VHT PPDU. The VHT-SIG-A 530 may include a VHT-SIG-A1 and a VHT-SIG-A2.

The VHT-SIG-A1 may include bandwidth information on a used channel, information on whether space-time block coding is applied, a group identifier (ID) for multi-user (MU)-multiple-input and multiple-output (MIMO) transmission, and information on the number of streams used for MU-MIMO transmission.

The VHT-SIG-A2 may include information on whether a short guard interval (GI) is used, forward error correction (FEC) information, information on a modulation and coding scheme (MCS) for a single user, information on channel coding types for multiple users, beamforming related information, redundancy bits for cyclic redundancy checking (CRC), and tail bits of a convolutional decoder.

The VHT-STF 540 may be used to improve automatic gain control estimation in an MIMO environment.

The VHT-LTF 550 may be used for channel estimation in an MIMO environment. An STA may perform channel estimation for 20/40/80/160/80+80 MHz channel bandwidths based on the VHT-LTF 550.

The VHT-SIG-B 560 may include information on each STA, that is, information on PSDU length and a MCS, tail bits, or the like.

In the embodiment of the present invention, an STA or AP receiving an interference avoidance request frame may perform channel estimation based on the training fields included in the NDP frame and determine a transmit steering matrix for forming a beam based on channel estimation.

Figure 6:
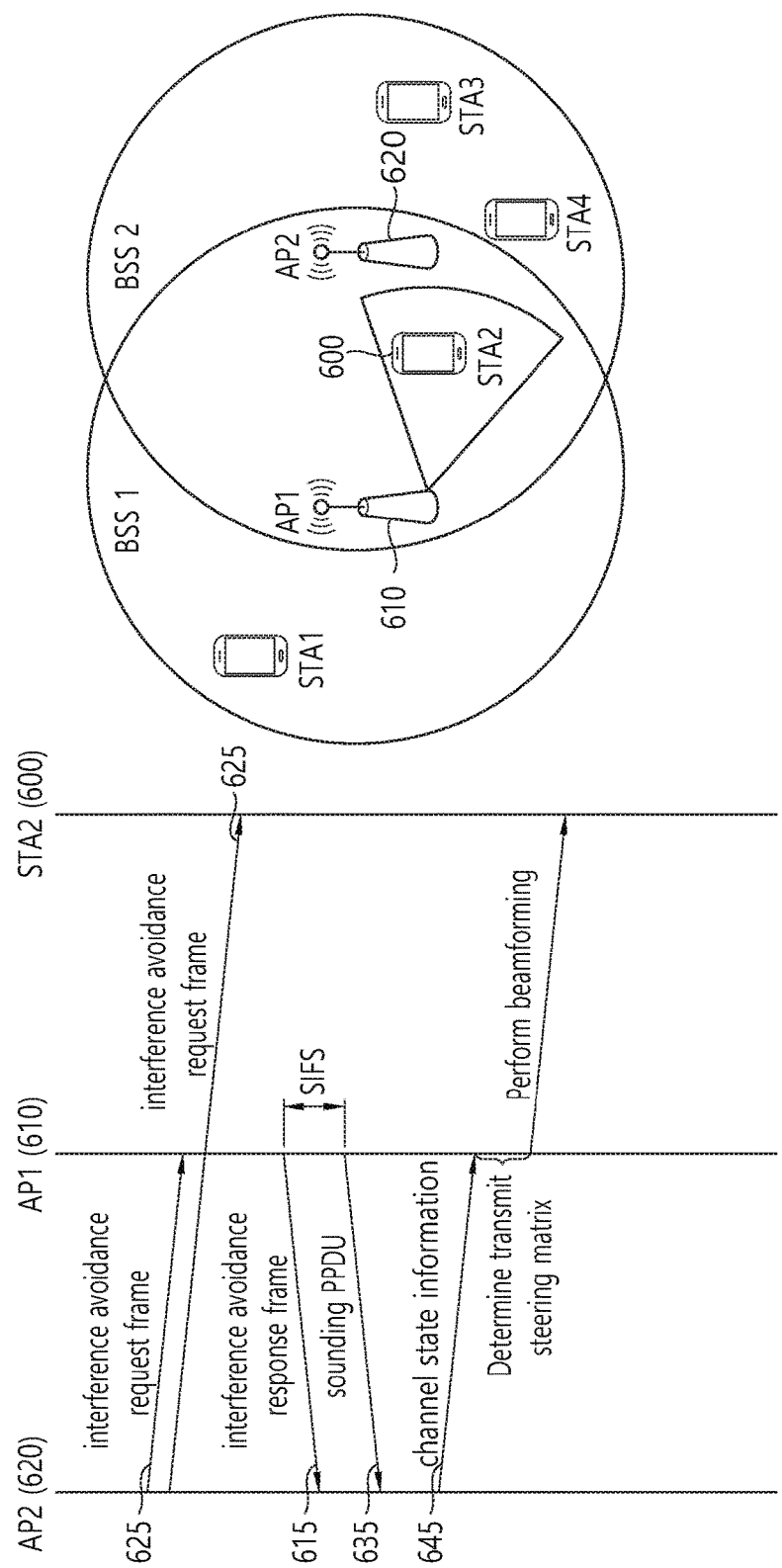
FIG. 6 is a conceptual view illustrating a method for reducing interference in an OBSS environment according to an embodiment of the present invention.

FIG. 6 is a conceptual view illustrating a method for reducing interference in an OBSS environment according to an embodiment of the present invention.

FIG. 6 illustrates a method in which an STA or AP receiving an interference avoidance request frame transmits a sounding PPDU after transmitting an interference avoidance response frame. Unlike in FIG. 4, the STA or AP transmitting the interference avoidance response frame may transmit the sounding PPDU, instead of the STA or AP transmitting the interference avoidance request frame.

Referring to FIG. 6, AP2 620 may broadcast an interference avoidance request frame, and AP1 610 may receive the interference avoidance request frame 625. AP1 610 receiving the interference avoidance request frame 625 may transmit a sounding PPDU (for example, an NDP frame) 620 after a certain amount of time (for example, short inter-frame space (SIFS)).

When AP1 610 transmits a sounding PPDU 635 to AP2 620, AP2 620 may perform channel estimation for a channel between AP1 610 and AP2 620 based on the sounding PPDU 635. AP2 620 may transmit a result of channel estimation (channel estimation information or channel state information) 645 performed based on the sounding PPDU 635 to AP1 610.

AP1 610 may determine an appropriate transmit steering matrix for transmitting data to STA2 600 based on the channel state information 645 received from AP2 620. AP1 610 may generate a beam for transmitting data to STA2 600 using the transmit steering matrix determined based on the channel state information. In this case, interference in AP2 620 by the beam formed by AP1 610 may be reduced.

Figure 7:
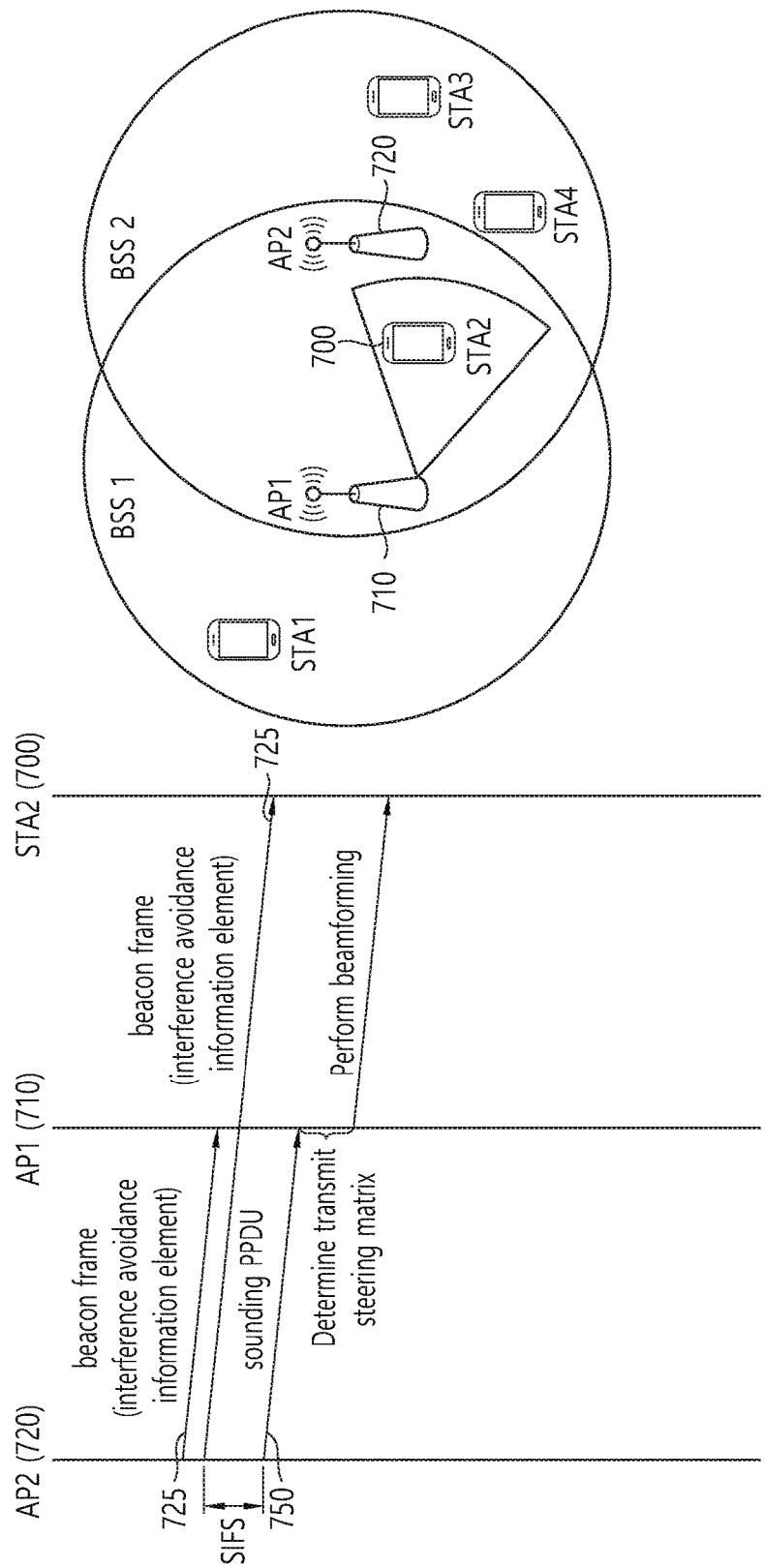
FIG. 7 is a conceptual view illustrating a method for reducing interference in an OBSS environment according to an embodiment of the present invention.

FIG. 7 is a conceptual view illustrating a method for reducing interference in an OBSS environment according to an embodiment of the present invention.

FIG. 7 illustrates an interference mitigation procedure (or interference mitigation protocol) using a beacon frame including an interference avoidance request information element without a request with an interference avoidance request frame. A beacon frame may be used to reduce signaling overhead by the interference avoidance request frame and the interference avoidance response frame used in the procedure for reducing interference in the OBSS illustrated in FIGS. 4 to 6.

Specifically, a beacon frame may be used for the interference mitigation procedure in the OBSS environment, instead of an interference avoidance response frame. The beacon frame may include an interference avoidance request information element (or interference avoidance information element). The beacon frame including the interference avoidance request information element may serve the same function as the interference avoidance request frame.

Referring to FIG. 7, AP2 720 may periodically transmit a beacon frame 725 including an interference avoidance request information element for interference mitigation. The interference avoidance request information element may indicate that transmission of a sounding PPDU 750 is performed SIFS after transmitting the beacon frame 725. AP2 720 may transmit the sounding PPDU (for example, an NDP frame) to AP1 710 for sounding SIFS after transmitting the beacon frame 725 including the interference avoidance request information element.

The transmitted sounding PPDU 725 may be a steered sounding PPDU for estimation of an effective channel. The steered sounding PPDU may be generated using a precoding matrix acquired based on another sounding PPDU transmitted by STA2 700 to AP2 720, which will be described below in a specific embodiment.

AP1 710 receiving the beacon frame 725 and the sounding PPDU 750 from AP2 720 may perform channel estimation for a channel between AP1 710 and AP2 720 based on training fields (for example, VHT-LTF) included in the sounding PPDU 750. AP1 710 may determine a transmit steering matrix based on a result of channel estimation (or channel state information). AP1 710 may form a beam based on the determined transmit steering matrix. The beam of AP1 710 formed based on the transmit steering matrix may reduce interference by AP1 710 in communication between AP2 720 and STA2 700.

Figure 8:
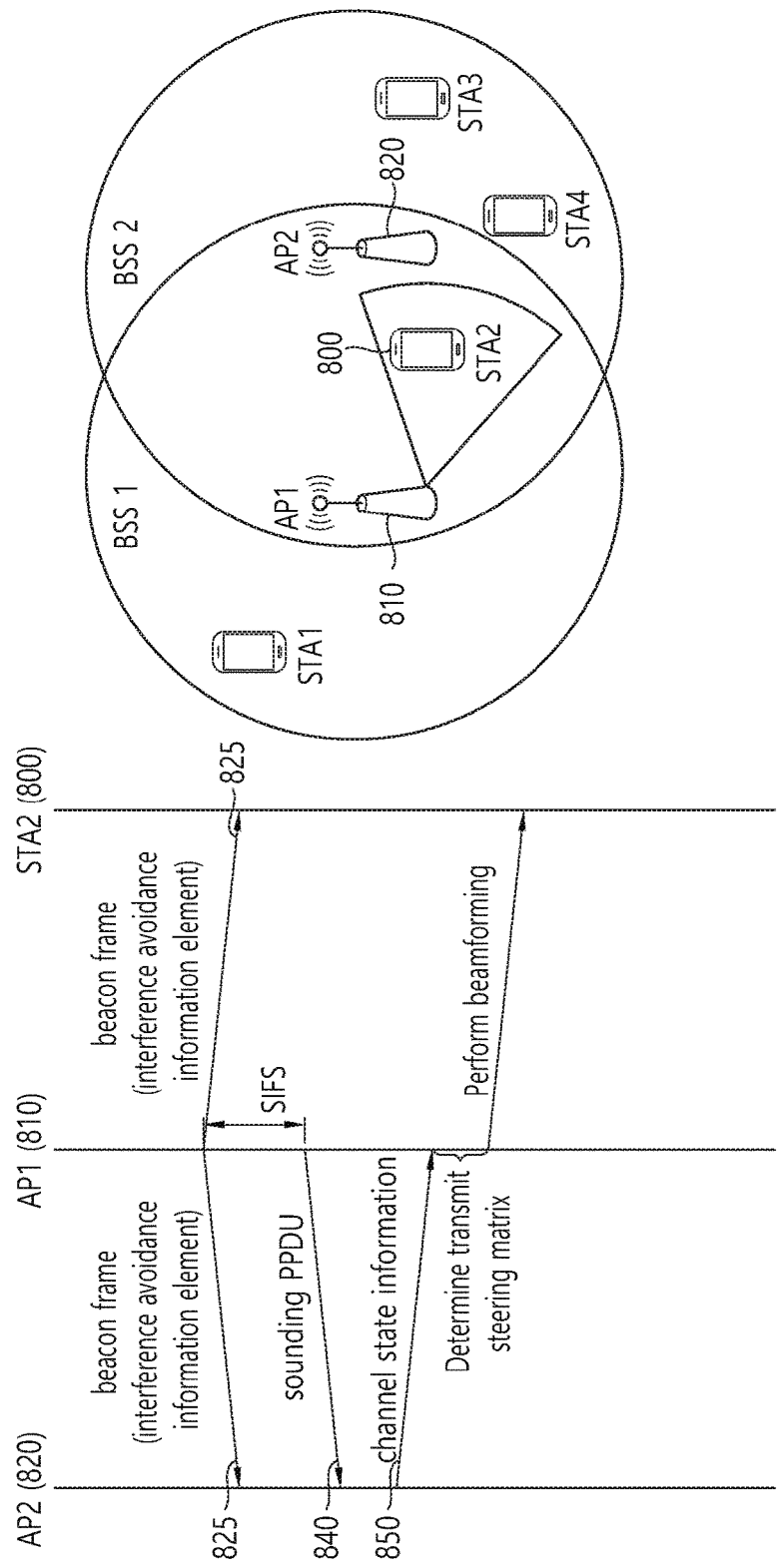
FIG. 8 is a conceptual view illustrating a method for reducing interference in an OBSS environment according to an embodiment of the present invention.

FIG. 8 is a conceptual view illustrating a method for reducing interference in an OBSS environment according to an embodiment of the present invention.

FIG. 8 illustrates an interference mitigation procedure (or interference mitigation protocol) using a beacon frame including an interference avoidance response information element without a request with an interference avoidance request frame. A beacon frame may be used to reduce signaling overhead by the interference avoidance request frame and the interference avoidance response frame used in the procedure for reducing interference in the OBSS illustrated in FIGS. 4 to 6.

Specifically, a beacon frame may be used for the interference mitigation procedure in the OBSS environment, instead of an interference avoidance response frame. The beacon frame may include an interference avoidance response information element (or interference avoidance information element). The beacon frame including the interference avoidance response information element may serve the same function as the interference avoidance response frame.

Referring to FIG. 8, AP1 810 may receive no interference avoidance request frame from AP2 820. AP1 810 may periodically transmit a beacon frame 825 including an interference avoidance response information element for interference mitigation. The interference avoidance response information element (or interference avoidance information element) may indicate that transmission of a sounding PPDU 840 is performed SIFS after transmitting the beacon frame 825. AP1 810 may transmit the sounding PPDU (for example, an NDP frame) 840 to AP2 820 for sounding SIFS after transmitting the beacon frame 825 including the interference avoidance response information element.

The transmitted sounding PPDU 840 may be a steered sounding PPDU for estimation of an effective channel. The steered sounding PPDU may be generated using a precoding matrix acquired based on another sounding PPDU transmitted by STA2 800 to AP1 810, which will be described below in a specific embodiment AP2 820 receiving the beacon frame 825 and the sounding PPDU 840 from AP1 810 may perform channel estimation for a channel between AP1 810 and AP2 820 based on training fields (for example, VHT-LTF) included in the sounding PPDU 840. AP2 820 may transmit a result of channel estimation (or channel state information 850 to AP1 810. AP2 820 may transmit the channel state information, which is included in a compressed beamforming report frame, to AP1 810. AP2 820 may include the channel state information in compressed beamforming report information included in the compressed beamforming report frame for transmission to AP1 810.

AP1 810 may determine a transmit steering matrix based on the channel state information 850 included in the frame transmitted from AP2 820. AP1 810 may form a beam based on the determined transmit steering matrix. The beam of AP1 810 formed based on the transmit steering matrix may reduce interference by AP1 810 in communication between AP2 820 and STA2 800.

That is, in the OBSS environment illustrated in FIGS. 7 and 8, the interference mitigation procedures are performed not by exchanges of an interference avoidance request frame/interference avoidance response frame between AP1 and AP2. The interference mitigation procedures may be performed by AP1 in an unsolicited manner.

Table 1 illustrates the channel state information included in the compressed beamforming report information.

TABLE 1

| (Channel Width) | Ng | Ns | (Subcarriers for which Compressed Feedback Beamforming Matrix subfield is sent: scidx(0), scidx(1), . . . , scidx(Ns − 1)) |
|---|---|---|---|
| 20 MHz | 1 | 52 | −28, −27, −26, −25, −24, −23, −22, −20, −19, −18, −17, −16, −15, −14, −13, −12, −11, −10, −9, −8, −6, −5, −4, −3, −2, −1, 1, 2, 3, 4, 5, 6, 8, 9, 10, 11, 12, 13, 14, 15, 16, 17, 18, 19, 20, 22, 23, 24, 25, 26, 27, 28 (NOTE - Pilot subcarriers (±21, ±7) and DC subcarrier (0) are skipped) |
|  | 2 | 30 | −28, −26, −24, −22, −20, −18, −16, −14, −12, −10, −8, −6, −4, −2, −1, 1, 2, 4, 6, 8, 10, 12, 14, 16, 18, 20, 22, 24, 26, 28 |
|  | 4 | 16 | −28, −24, −20, −16, −12, −8, −4, −1, 1, 4, 8, 12, 16, 20, 24, 28, |
| 40 MHz | 1 | 108 | −58, −57, −56, −55, −54, −52, −51, −50, −49, −48, −47, −46, −45, −44, −43, −42, −41, −40, −39, −38, −37, −36, −35, −34, −33, −32, −31, −30, −29, −28, −27, −26, −24, −23, −22, −21, −20, −19, −18, −17, −16, −15, −14, −13, −12, −10, −9, −8, −7, −6, −5, −4, −3, −2, 2, 3, 4, 5, 6, 7, 8, 9, 10, 12, 13, 14, 15, 16, 17, 18, 19, 20, 21, 22, 23, 24, 26, 27, 28, 29, 30, 31, 32, 33, 34, 35, 36, 37, 38, 39, 40, 41, 42, 43, 44, 45, 46, 47, 48, 49, 50, 51, 52, 54, 55, 56, 57, 58 (NOTE - Pilot subcarriers (±53, ±25, ±11) and DC subcarrier (0, ±1) are skipped) |
|  | 2 | 58 | −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58 |
|  | 4 | 30 | −58, −54, −50, −46, −42, −38, −34, −30, −26, −22, −18, −14, −10, −6, −2, 2, 6, 10, 14, 18, 22, 26, 30, 34, 38, 42, 46, 50, 54, 58 |
| 80 MHz | 1 | 234 | −122, −121, −120, −119, −118, −117, −116, −115, −114, −113, −112, −111, −110, −109, −108, −107, −106, −105, −104, −102, −101, −100, −99, −98, −97, −96, −95, −94, −93, −92, −91, −90, −89, −88, −87, −86, −85, −84, −83, −82, −81, −80, −79, −78, −77, −76, −74, −73, −72, −71, −70, −69, −68, −67, −66, −65, −64, −63, −62, −61, −60, −59, −58, −57, −56, −55, −54, −53, −52, −51, −50, −49, −48, −47, −46, −45, −44, −43, −42, −41, −40, −38, −37, −36, −35, −34, −33, −32, −31, −30, −29, −28, −27, −26, −25, −24, −23, −22, −21, −20, −19, −18, −17, −16, −15, −14, −13, −12, −10, −9, −8, −7, −6, −5, −4, −3, −2, 2, 3, 4, 5, 6, 7, 8, 9, 10, 12, 13, 14, 15, 16, 17, 18, 19, 20, 21, 22, 23, 24, 25, 26, 27, 28, 29, 30, 31, 32, 33, 34, 35, 36, 37, 38, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 76, 77, 78, 79, 80, 81, 82, 83, 84, 85, 86, 87, 88, 89, 90, 91, 92, 93, 94, 95, 96, 97, 98, 99, 100, 101, 102, 104, 105, 106, 107, 108, 109, 110, 111, 112, 113, 114, 115, 116, 117, 118, 119, 120, 121, 122 NOTE - Pilot subcarriers (±103, ±75, ±39, ±11) and DC subcarrier (0, ±1) are skipped. |
|  | 2 | 122 | −122, −120, −118, −116, −114, −112, −110, −108, −106, −104, −102, −100, −98, −96, |

TABLE 1-continued

| (Channel Width) | Ng | Ns | (Subcarriers for which Compressed Feedback Beamforming Matrix subfield is sent: scidx(0), scidx(1), . . . , scidx(Ns − 1)) |
|---|---|---|---|
| | | | −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122 |
| | 4 | 62 | −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122 |

Referring to Table 1, Ns may indicate the total number of indexes of subcarrier for transmitting a beamforming feedback matrix. Ng may indicate a difference between indexes of neighboring subcarriers. In a channel bandwidth of 80 MHz, when Ng is 1, Ns may indicate 234 subcarriers. When Ng is 2, Ns may indicate 122 subcarriers, and when Ng is 4, Ns may indicate 62 subcarriers. Channel state information may include information on Ns subcarriers. Specifically, the channel state information may be determined based on a beamforming feedback matrix for Ns subcarriers. As described above, an interfering AP may determine a transmit steering matrix based on the channel state information. The interfering AP may form a beam based on the determined transmit steering matrix.

FIGS. 4 to 8 illustrate the interference mitigation procedures of a plurality of APs positioned in an overlapping basic service area (BSA) when BSAs of a plurality of BSSs overlap with each other. That is, in the OBSS environment, an interfering AP is positioned in the coverage of the first BSS including an AP and the AP is positioned in the coverage of the second BSS including the interfering AP. The interference mitigation procedures may be performed not only between APs but also between an AP and an STA.

Figure 9:
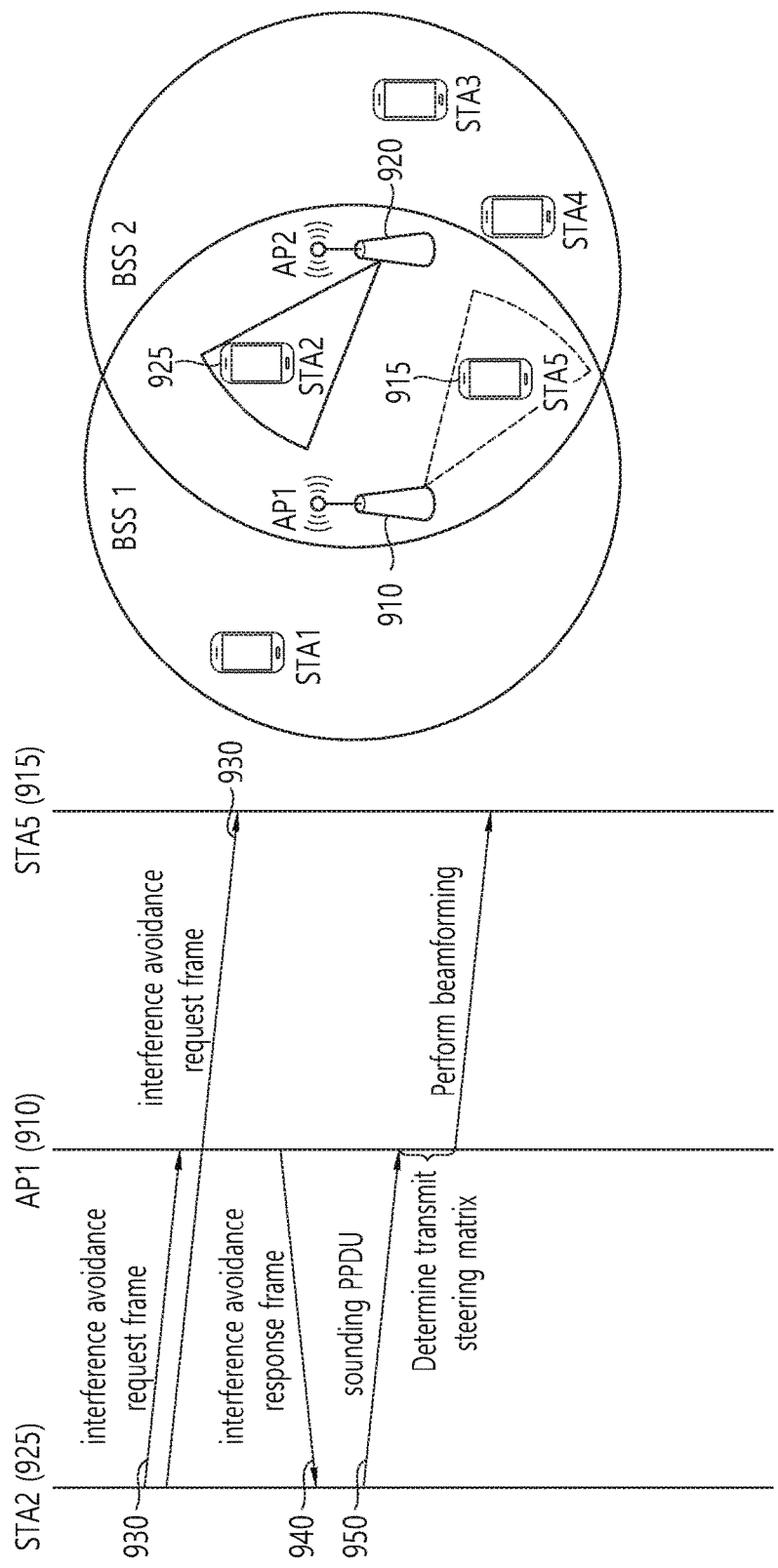
FIG. 9 is a conceptual view illustrating an interference mitigation method according to an embodiment of the present invention.

FIG. 9 is a conceptual view illustrating an interference mitigation method according to an embodiment of the present invention.

FIG. 9 illustrates a method in which an STA performs an interference mitigation procedure by transmitting a sounding PPDU to an interfering AP.

Referring to FIG. 9, it may be assumed that AP2 920 transmits data to STA2 925, simultaneously with AP1 910 transmitting data to STA5 915. In this case, a beam formed by AP1 910 may cause interference in communication between AP2 920 and STA2 925 to deteriorate communication performance.

In order to avoid deterioration in communication performance by interference, STA2 925 may broadcast an interference avoidance request frame 930. AP1 910 may receive the interference avoidance request frame 930 from STA2 925 and transmit an interference avoidance response frame 940 to STA2 925 in response to the interference avoidance request frame 930. STA2 925 may receive the interference avoidance response frame 940 from AP1 910 and transmit a sounding PPDU 950 to AP1 910. AP1 910 may acquire channel state information on a channel between STA2 925 and AP1 910 based on the sounding PPDU 950 received from STA2 925. AP1 910 may determine a transmit steering matrix based on the channel state information. When AP1 910 forms a beam based on the determined transmit steering matrix, interference by the beam formed by AP1 910 may be reduced in communication between STA2 925 and AP2 920.

The sounding PPDU 950 transmitted by STA2 925 to AP1 910 may be an NDP frame. As described above, AP1 910 may perform channel estimation for 20/40/80/160/80+80 MHz channel bandwidths based on a training field (for example, VHT-LTF) included in the NDP frame. Further, AP1 910 may determine the transmit steering matrix based on a result of channel estimation (channel state information).

Figure 10:
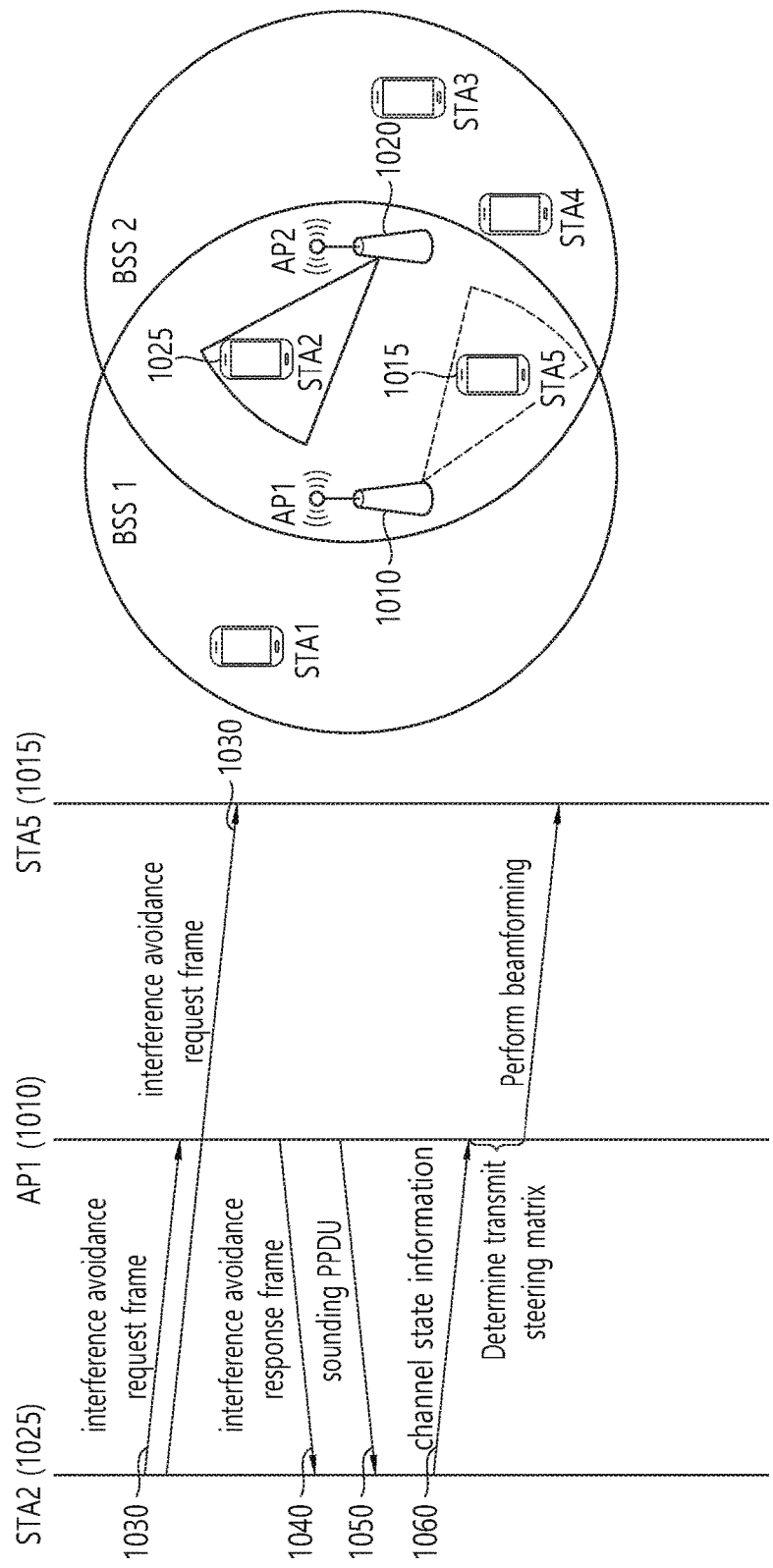
FIG. 10 is a conceptual view illustrating an interference mitigation method according to an embodiment of the present invention.

FIG. 10 is a conceptual view illustrating an interference mitigation method according to an embodiment of the present invention.

FIG. 10 illustrates an interference mitigation procedure performed based on a sounding PPDU transmitted from an STA transmitting an interference avoidance response frame.

Referring to FIG. 10, STA2 1025 may broadcast an interference avoidance request frame 1030. AP1 1015 may receive the interference avoidance request frame 1030 from STA2 1025 and transmit an interference avoidance response frame 1040 to STA2 1025 in response to the interference avoidance request frame 1030. AP1 1010 may transmit a sounding PPDU 1050 to STA2 1025 SIFS after transmitting the interference avoidance response frame 1040.

STA2 1025 may acquire channel state information 1060 on a channel between AP1 1010 and STA2 1025 based on the sounding PPDU 1050 received from AP1 1010. STA2 1025 may transmit the acquired channel state information 1060 to AP1 1010. AP1 1010 may determine a transmit steering matrix based on the channel state information 1060 received from STA2 1025. When AP1 1010 forms a beam based on the determined transmit steering matrix, interference in STA2 1025 by the beam formed by AP1 1010 may be reduced.

Figure 11:
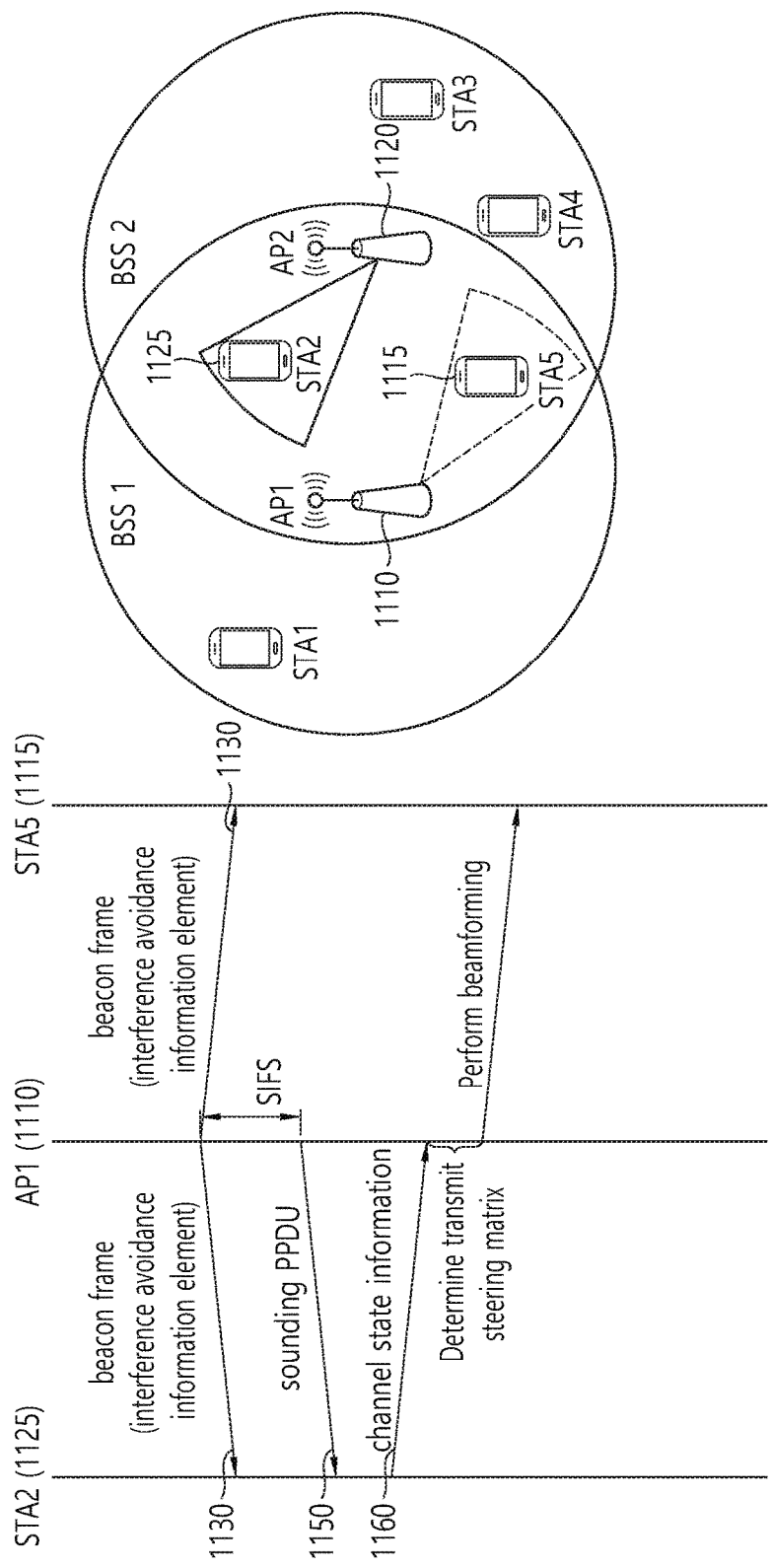
FIG. 11 is a conceptual view illustrating an interference mitigation method in an OBSS environment according to an embodiment of the present invention.

FIG. 11 is a conceptual view illustrating an interference mitigation method in an OBSS environment according to an embodiment of the present invention.

In FIG. 11, AP1 1110 may transmit a beacon frame 1130, instead of an interference avoidance response frame, in order to reduce signaling overhead caused by an interference mitigation request frame and an interference mitigation response frame in an interference mitigation procedure. That is, the interference mitigation procedure (or interference mitigation protocol) may be performed using the beacon frame 1130 including an interference avoidance response information element (or interference avoidance information element) without a request with an interference avoidance request frame. The beacon frame 1130 including the interference avoidance response information element may serve a similar function to an interference avoidance response frame.

Referring to FIG. 11, AP1 1110 may periodically transmit the beacon frame 1130 including the interference avoidance response information element for interference mitigation. The interference avoidance response information element (or interference avoidance information element) may indicate that transmission of a sounding PPDU 1150 is performed SIFS after transmitting the beacon frame 1130.

AP1 1110 may transmit the sounding PPDU (for example, an NDP frame) 1150 for sounding SIFS after transmitting the beacon frame 1130. The transmitted sounding PPDU 1150 may be a steered sounding PPDU for estimation of an effective channel. The steered sounding PPDU may be generated using a precoding matrix acquired based on another sounding PPDU transmitted by AP2 1120 to AP1 1110, which will be described below in a specific embodiment.

STA2 1125 receiving the beacon frame 1130 and the sounding PPDU 1150 from AP1 1110 may acquire channel state information on a channel between AP1 1110 and STA2 1125 based on a training field (for example, VHT-LTF) included in the sounding PPDU 1150. STA2 may transmit the acquired channel state information 1160 to AP1 1110. STA2 1125 may transmit the channel state information 1160, which is included in a compressed beamforming report frame, to AP1 1110. Specifically, STA2 1125 may include the channel state information 1160 in compressed beamforming report information included in the compressed beamforming report frame for transmission to AP1 1110. The channel state information 1160 may include information on Nx subcarriers for a particular channel bandwidth. Specifically, the channel state information 1060 may be determined based on a beamforming feedback matrix for Ns subcarriers.

AP1 1110 may determine a transmit steering matrix based on the channel state information 1160 included in the frame transmitted from STA2 1125 to form a beam. The transmit steering matrix determined by AP1 1110 may reduce interference by AP1 1110 in communication between STA2 1125 and AP2 1120.

That is, in the OBSS environment illustrated in FIG. 11, the interference mitigation procedure is performed not by exchanges of an interference avoidance request frame/interference avoidance response frame between AP1 1110 and STA2 1125. The interference mitigation procedure may be performed by AP1 1110 in an unsolicited manner.

Figure 12:
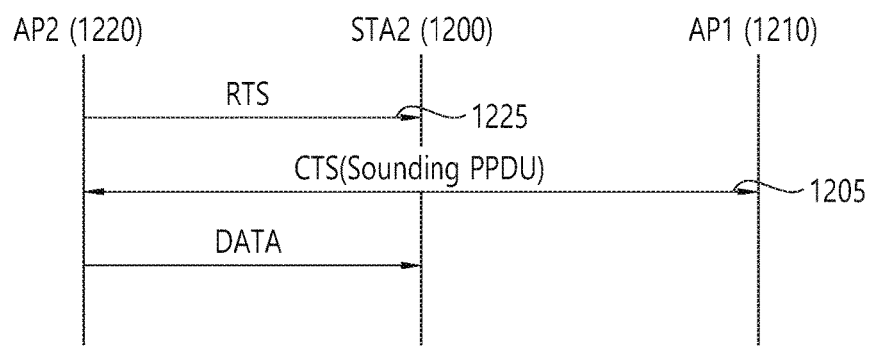
FIG. 12 is a conceptual view illustrating an interference mitigation method in an OBSS environment according to an embodiment of the present invention.

FIG. 12 is a conceptual view illustrating an interference mitigation method in an OBSS environment according to an embodiment of the present invention.

FIG. 12 illustrates a method in which AP2 starts transmitting a sounding PPDU based on a request to send (RTS) frame/clear to send (CTS) frame.

AP2 1220 may transmit an RTS frame 1225 or a frame performing similar functions to the RTS frame 1225 (similar RTS frame) to STA2 1200 before transmitting a data frame to STA2 1200.

STA2 1200 may transmit a CTS frame 1205 or a frame performing similar functions to the CTS frame (similar CTS frame) to AP1 1210 or AP2 1220. The CTS frame 1205 or similar CTS frame may serve the same function as a sounding PPDU. AP1 1210 and/or AP2 1220 may receive the CTS frame 1205 or similar CTS frame and generate channel state information based on the received CTS frame 1205 or similar CTS frame. Hereinafter, in the embodiment of the present invention, the CTS frame 1205 or similar CTS frame serving as a sounding PPDU may be referred to as a sounding CTS frame.

AP1 1210 may determine a transmit steering matrix using the channel state information on a channel between STA2 1200 and AP1 1210 acquired based on the sounding CTS frame 1205. The transmit steering matrix determined by AP1 1210 may be used to form a beam for mitigating interference by AP1 1210 in communication between STA2 1200 and AP2 1220.

Alternatively, an STA receiving an RTS frame may transmit a separate sounding PPDU to the AP, instead of a CTS frame. For example, AP2 may transmit an RTS frame or a frame performing similar functions to the RTS frame (similar RTS frame) to STA2 before transmitting a data frame to STA2. STA2 may transmit a CTS frame or a similar CTS frame to AP1 or AP2. STA2 may transmit a separate sounding PPDU after transmitting the CTS frame or similar CTS frame. Specifically, STA2 may transmit the sounding PPDU (for example, an NDP frame) SIFS after transmitting the CTS frame or similar CTS frame.

AP1 receiving the sounding PPDU may generate channel state information on a channel between STA2 and AP1. AP1 may determine a transmit steering matrix using the channel state information on the channel between STA2 and AP1 acquired based on the sounding PPDU. The transmit steering matrix determined by AP1 may reduce interference by AP1 in communication between STA2 and AP2.

The CTS frame transmitted by STA2 may include an interference mitigation indication field. The interference mitigation indication field may indicate that transmission of a sounding PPDU for sounding for interference mitigation is performed after transmission of the CTS frame.

According to another embodiment of the present invention, the sounding PPDUs transmitted in FIGS. 4 to 12 may be a steered sounding PPDU. The steered sounding PPDU may be used for estimation of an effective channel between an AP and/or an STA transmitting the steered sounding PPDU and an AP and/or an STA receiving the steered sounding PPDU.

Figure 13:
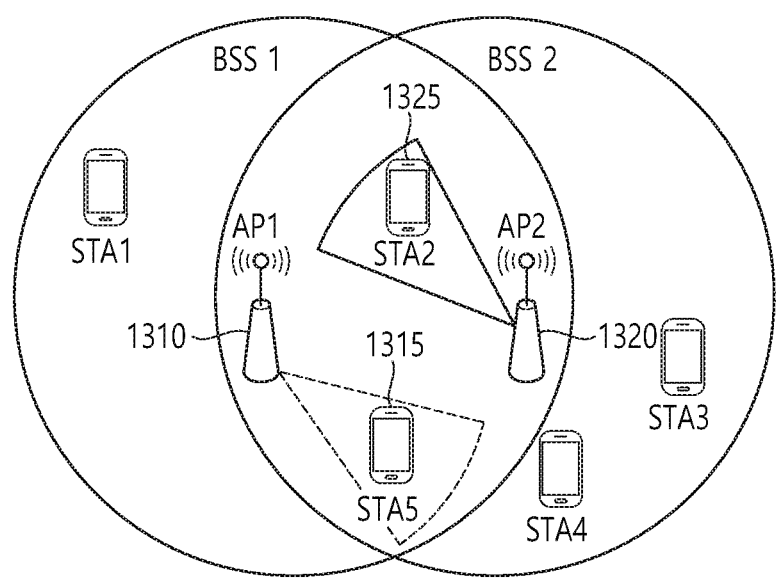
FIG. 13 is a conceptual view illustrating a method of transmitting a steered sounding PPDU according to an embodiment of the present invention.

FIG. 13 is a conceptual view illustrating a method of transmitting a steered sounding PPDU according to an embodiment of the present invention.

Referring to FIG. 13, STA2 1325 may transmit a steered sounding PPDU to AP1 1310. Here, STA2 1325 may decompose an estimated channel between AP2 1320 and STA2 1325 (for example, using singular value decomposition (SVD)) to acquire a receiving matrix. STA2 1325 may use the acquired receiving matrix as a precoding matrix for the steered sounding PPDU. That is, STA2 1325 may transmit the steered sounding PPDU, precoded using the receiving matrix determined by decomposing the channel between AP2 1320 and STA2 1325, to AP1 1310. AP1 1310 may estimate an effective channel between AP1 1310 and STA2 1325 based on the steered sounding PPDU to form a beam. According to this method, interference by AP1 1310 in STA2 1325 may be reduced.

Defining the channel between AP1 1310 and STA2 1325 as H1 and the channel between AP2 1320 and STA2 1325 as H2, a received signal r of STA2 1325 may be represented by Equation 1.

$$r = H_2 P_2 x_2 + H_1 P_1 x_1 + n \qquad \text{<Equation 1>}$$

In Equation 1, P1 may be a precoding matrix of a signal transmitted from AP1 1310 to STA2 1325, and P2 may be a precoding matrix of a signal transmitted from AP2 1320 to STA2 1325.

x1 may be data transmitted from AP1 1310 to STA2 1325, x2 may be data transmitted from AP2 1320 to STA2 1325, and n may be noise. Here, signal $H_1 P_1 x_1$ transmitted by AP1 1310 is an interfering signal for STA2 1325, and a signal to be received by STA2 1325 is $H_2 P_2 x_2$.

Since AP2 1320 has information on the channel between AP2 1320 and STA2 1325, AP2 1320 may properly select precoding matrix P2. For example, using channel decomposition, STA2 1325 may select U2 as a receiving matrix and V2 as P2 according to Equation 2.

$$U_2^H r = U_2^H H_2 P_2 x_2 + U_2^H H_1 P_1 x_1 + U_2^H n$$
$$= U_2^H U_2 \Sigma V_2^H P_2 x_2 + U_2^H H_1 P_1 x_1 + U_2^H n$$
$$= \Sigma x_2 + U_2^H H_1 P_1 x_1 + U_2^H n$$

⟨Equation 2⟩

Here, when a signal $U_2^H H_1 P_1$ transmitted from AP1 1310, which causes interference for STA2 1325, has a value close to 0, there is less interference in communication STA2 1325 and AP2 1320.

A precoding matrix P1 for $U_2^H H_1 P_1$ to be 0 is selected by AP1 1310. However, in a situation where AP1 1310 is capable of estimating only H1 as a channel between AP1 1310 and STA2 1325, interference avoidance to make $U_2^H H_1 P_1$ 0 (or to minimize $U_2^H H_1 P_1$ close to 0) is restricted.

For effective interference avoidance, AP1 1310 need to estimate an effective channel $U_2^H H_1$. STA2 1325 may transmit a sounding PPDU precoded with $U_2^H$ to AP1 1310 so that AP1 1310 may estimate the effective channel $U_2^H H_1$. AP1 1310 may determine the precoding matrix P1 based on the received precoded sounding PPDU such that $U_2^H H_1 P_1$ has a value of 0.

Figure 14:
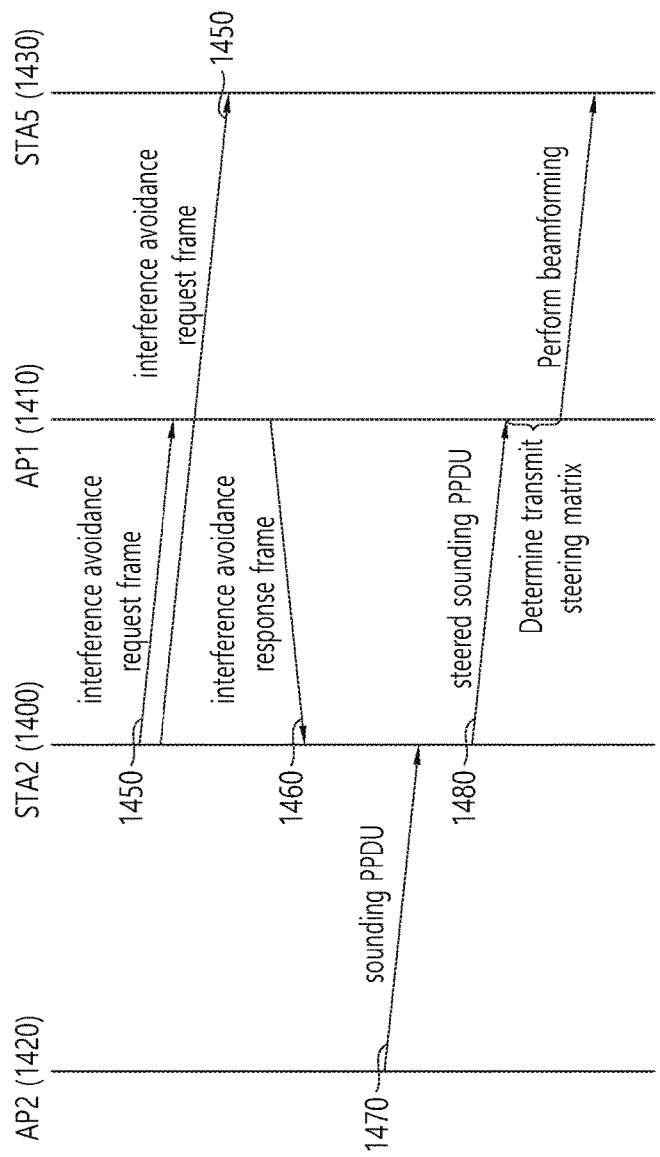
FIG. 14 is a flowchart illustrating a method of transmitting a steered sounding PPDU according to an embodiment of the present invention.

FIG. 14 is a flowchart illustrating a method of transmitting a steered sounding PPDU according to an embodiment of the present invention.

Referring to FIG. 14, STA2 1400 may transmit an interference avoidance request frame 1450, and AP1 1410 may transmit an interference avoidance response frame 1460 in response.

In the foregoing embodiment of the present invention, STA2 may transmit a sounding PPDU to AP1, and AP1 may acquire channel state information based on the received sounding PPDU and calculate a transmit steering matrix based on the channel state information. A beam formed based on the calculated transmit steering matrix may be used to transmit data to STA5.

In FIG. 14, STA2 1400 may transmit effective channel information to AP1 1410 so that AP1 1410 may estimate an effective channel. Specifically, STA2 1400 may transmit effective channel information to AP1 1410 through a steered sounding PPDU 1480. A precoding matrix multiplied by the steered sounding PPDU 1480 may be obtained based on a sounding PPDU 1470 transmitted by AP2 1420 to STA2 1400. That is, STA2 1400 may acquire a receiving matrix (precoding matrix) based on the sounding PPDU 1470 transmitted by AP2 1420, and precode a sounding PPDU transmitted to AP1 1410 based on the acquired receiving matrix. The sounding PPDU precoded based on the acquired receiving matrix, which is the steered sounding PPDU 1480, may be transmitted to AP1 1410.

Subsequently, AP1 1410 may form a beam towards minimization of interference in STA2 1400 based on the steered sounding PPDU 1480 to transmit data.

The embodiment of FIG. 14 illustrates the method in which AP1 1400 receives the steered sounding PPDU reflecting the effective channel information from STA2 1400 and acquires the effective channel information. According to another embodiment, however, AP1 may obtain the effective channel information $U_2^H H_1$ not by channel estimation, but STA2 may transmit the effective channel information $U_2^H H_1$ directly to AP 1. That is, STA2 may transmit a frame including the effective channel information, instead of the steered sounding PPDU, to AP1. Here, the effective channel information $U_2^H H_1$ may be transmitted as quantized data.

According to an alternative method, a covariance of a channel between STA2 and AP2 as compressed information may be transmitted in addition to $H_1$, thereby obtaining the same result as in the steered sounding PPDU is transmitted. That is, transmitting the frame including the effective channel information may be replaced with transmitting the covariance of the channel between STA2 and AP2 as compressed information in addition to $H_1$.

Alternatively, there is a case where it is impossible to reduce interference by AP1 or it is necessary to selectively reduce only part of the interference. In this case, a sounding PPDU is precoded based on a receiving matrix to transmit a steered sounding PPDU to AP1, the receiving matrix being a matrix representing an interference subspace causing greatest interference for STA2 or a matrix for a signal to selectively attenuate.

In a similar manner to the interference mitigation procedures based on the sounding PPDUs illustrated in FIGS. 4 to 12, the steered sounding PPDUs may be used or the frame including the effective channel information may be directly transmitted in FIGS. 13 and 14.

Figure 15:
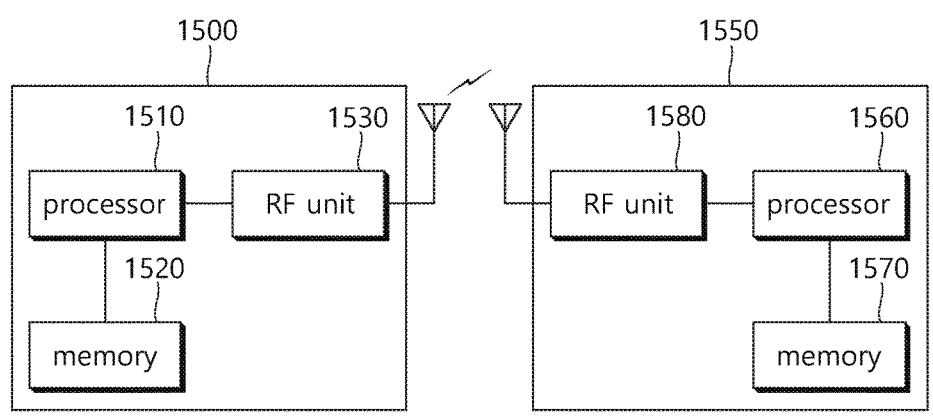
FIG. 15 is a block diagram illustrating a wireless device according to an embodiment of the present invention.

FIG. 15 is a block diagram illustrating a wireless device according to an embodiment of the present invention.

Referring to FIG. 15, the wireless device 1500 may be an STA to implement the foregoing embodiments, which may be an AP 1550 or a non-AP STA (or STA) 1500.

The STA 1500 includes a processor 1510, a memory 1520, and a radio frequency (RF) unit 1530.

The RF unit 1530 may be connected to the processor 1520 to transmit/receive a radio signal.

The processor 1520 may implement functions of an STA, processes and/or methods suggested in the present invention. For example, the processor 1520 may be configured to perform operations of a wireless device according to the foregoing embodiments of the present invention. The processor may perform operations of an STA illustrated in the embodiments of FIGS. 4 to 14.

For example, the processor 1520 may be configured to transmit an interference avoidance request frame to an AP and to receive an interference avoidance response frame from the AP in response to the interference avoidance request frame. Further, the processor may be configured to transmit a sounding PPDU to the AP transmitting the interference avoidance response frame.

The processor may be configured to receive a broadcast beacon frame, which includes an interference avoidance information element, to receive a sounding PPDU indicated based on the interference avoidance information element from another AP, to determine transmit steering matrix based on the sounding PPDU, and to transmit data through a beam generated based on the transmit steering matrix.

The AP 1550 includes a processor 1560, a memory 1570, and an RF unit 1580

The RF unit 1580 may be connected to the processor 1560 to transmit/receive a radio signal.

The processor 1560 may implement functions, processes and/or methods suggested in the present invention. For example, the processor 1520 may be configured to perform operations of a wireless device according to the foregoing embodiments of the present invention. The processor may perform operations of an AP illustrated in the embodiments of FIGS. 4 to 14.

For example, the processor 1560 may be configured to receive a beacon frame broadcast by another AP, which includes an interference avoidance information element, to receive a sounding PPDU indicated based on the interference avoidance information element from the other AP, to determine transmit steering matrix based on the sounding PPDU, and to transmit data through a beam generated based on the transmit steering matrix.

The processors 1510 and 1560 may include an application-specific integrated circuit (ASIC), other chipsets, a logic circuit, a data processor and/or a converter to convert a baseband signal and a radio signal from one to the other. The memories 1520 and 1570 may include a read-only memory (ROM), a random access memory (RAM), a flash memory, a memory card, a storage medium and/or other storage devices. The RF units 1530 and 1580 may include at least one antenna to transmit and/or receive a radio signal.

When the embodiments are implemented with software, the foregoing techniques may be implemented by a module (process, function, or the like) for performing the foregoing functions. The module may be stored in the memories 1520 and 1570 and be executed by the processors 1510 and 1560. The memories 1520 and 1570 may be disposed inside or outside the processors 1510 and 1560 or be connected to the processors 1510 and 1560 via various well-known means.

What is claimed is:

1. A method of preventing interference in an overlapping service area of a wireless local area network (WLAN), the method comprising:
   receiving, by an interfering access point (AP), a beacon frame broadcasted by an AP periodically, the beacon frame comprising an interference avoidance information element,
   wherein the beacon frame is used instead of an interference prevention request frame and an interference prevention response frame used for preventing interference in the overlapping service area;
   receiving, by the interfering AP, a null data packet (NDP) frame indicated based on the interference avoidance information element from the AP,
   wherein the NDP frame is received from the AP without transmitting the interference prevention response frame;
   determining, by the interfering AP, a transmit steering matrix based on the NDP frame,
   wherein the transmit steering matrix is determined based on channel state information between the interfering AP and the AP,
   wherein the channel state information includes a beamforming feedback matrix for a plurality of subcarriers transmitted in 20 MHz, 40 MHz, 80 MHz, 160 MHz, or 80+80 MHz channel bandwidths, and
   wherein the channel state information is acquired by a training field included in the NDP frame; and
   transmitting, by the interfering AP, data to a station (STA) associated with the AP through a beam generated based on the transmit steering matrix.

2. The method of claim 1, wherein the interference avoidance information element indicates that transmission of the NDP frame is performed a short inter-frame symbol (SIFS) after transmission of the beacon frame.

3. The method of claim 1, wherein the transmit steering matrix is determined to reduce interference by the interfering AP in communication between the AP and the STA based on the channel state information.

4. The method of claim 1, wherein the interfering AP is positioned in coverage of a first basic service set (BSS) comprising the AP, and the AP is positioned in coverage of a second BSS comprising the interfering AP.

5. An access point (AP) for preventing interference in an overlapping service area of a wireless local area network (WLAN), the AP comprising:
   a radio frequency (RF) unit configured to transmit or receive a radio signal; and
   a processor selectively connected to the RF unit,
   wherein the processor is configured to:
   receive a beacon frame broadcasted by another AP periodically, the beacon frame comprising an interference avoidance information element,
   wherein the beacon frame is used instead of an interference prevention request frame and an interference prevention response frame used for preventing interference in the overlapping service area;
   receive a null data packet (NDP) frame indicated based on the interference avoidance information element from the other AP,
   wherein the NDP frame is received from the AP without transmitting the interference prevention response frame;
   determine a transmit steering matrix based on the NDP frame,
   wherein the transmit steering matrix is determined based on channel state information between the AP and the other AP,
   wherein the channel state information includes a beamforming feedback matrix for a plurality of subcarriers transmitted in 20 MHz, 40 MHz, 80 MHz, 160 MHz, or 80+80 MHz channel bandwidths, and
   wherein the channel state information is acquired by a training field included in the NDP frame; and
   transmit data to a station (STA) associated with the other AP through a beam generated based on the transmit steering matrix.

6. The AP of claim 5, wherein the interference avoidance information element indicates that transmission of the NDP frame is performed a short inter-frame symbol (SIFS) after transmission of the beacon frame.

7. The AP of claim 5, wherein the transmit steering matrix is determined to reduce interference by the AP in communication between the other AP and the STA based on the channel state information.

8. The AP of claim 5, wherein the AP is positioned in coverage of a first basic service set (BSS) comprising the other AP, and the other AP is positioned in coverage of a second BSS comprising the AP.

* * * * *